2,857,396
HYDROXYPHTHALIMIDINES

Donald D. Wheeler and David C. Young, Midland, Mich., assignors to The Dow Chemical Company, Midland, Mich., a corporation of Delaware No Drawing. Application August 5, 1957
Serial No. 676,381

5 Claims. (Cl. 260—325)

The present invention concerns N-substituted-3-hydroxyphthalimidines having the formula

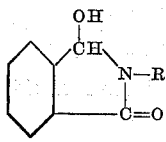

wherein R represents alkyl having from 4 to 8 carbon atoms, inclusive, or cyclohexyl. The compounds of the present invention are oily liquids or crystalline solids somewhat soluble in many organic solvents and substantially insoluble in water. They have been found to be active as parasiticides and of particular activity as plant growth control materials and are adapted to be employed in dust and spray compositions for the control and the killing of weeds and for the sterilization of soil with regard to the growth of plants.

The new compounds may be prepared by reacting together phthalaldehydic acid and a primary amine. The reaction conveniently may be carried out in the presence of a solvent inert under the conditions of the reaction such as methyl ethyl ketone. Good results are obtained when substantially equimolecular proportions of the reactants are employed.

In carrying out the reaction, the phthalaldehydic acid and primary amine are mixed or otherwise blended together and the resulting mixture heated at a temperature of from about 100° to 200° C. for a period of time of from about one to ten hours. Alternatively the phthalaldehydic acid and amine may be dispersed in an inert solvent such as methyl ethyl ketone, and the resulting mixture heated to distill off the solvent. Thereafter the reaction mixture is heated to the reaction tempertaure range for a period of time to complete the reaction. The desired product may be recovered in any convenient manner such as described in the following examples. In one such operation the desired product is extracted with benzene and recrystallized therefrom. In another procedure the reaction mixture is dissolved in benzene and the desired product recovered therefrom by caustic extraction. In still another procedure the reaction mixture is dissolved in benzene washed with caustic, distilled to remove the benzene, heated with caustic, extracted with benzene and distilled under reduced pressure to remove the solvent. The product, if a solid, may be further purified by recrystallization from a suitable solvent, and, if a liquid, by solvent extraction, washing and distillation to remove the solvent.

The following examples are illustrative of the present invention but are not to be construed as limiting.

Example 1.—2-butyl-3-hydroxyphthalimidine

Phthalaldehydic acid (150 grams; 1.0 mole) was slowly mixed with 73 grams (1.0 mole) of n-butylamine. The resulting mixture was heated at a temperature of 105–115° C. and under reflux for two hours. At the end of this period the mixture was fractionally distilled under reduced pressure to remove the low boiling constituents, thereafter the residue was heated at a temperature of 170°–180° C. for 6 hours. Upon completion of the reaction the mixture was cooled to room temperature, dissolved in 300 milliliters of benzene and extracted with aliquot portions of 5 percent caustic until 500 milliliters of the extractant had been employed. The extractant was neutralized with $CO_2$ (Dry Ice) to precipitate a solid product. The solid was recovered by filtration, washed with water and dried to obtain a 2-butyl-3-hydroxyphthalimidine product as a crystalline solid. The latter was found to melt at 69°–70° C.

Example 2.—2-butyl-3-hydroxyphthalimidine

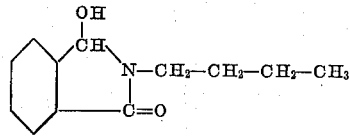

One-half mole (75 grams) of phthalaldehydic acid and one-half mole (36.5 grams) of normal butylamine were mixed together and the resulting mixture heated at the boiling temperature (105°–115° C.) and under reflux for three hours. Upon completion of this period the resulting oily reaction mixture was poured into 700 milliliters of water, decanted, washed with water and the oily residue extracted with benzene. The extractant was separated and fractionally distilled under reduced pressure to remove the benzene. The residue, a 2-butyl-3-hydroxyphthalimidine product, was identified by infrared spectra.

Example 3.—2-octyl-3-hydroxyphthalimidine

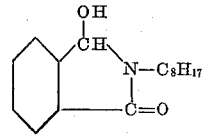

One-half mole (75 grams) of phthalaldehydic acid and one-half mole (65.5 grams) of normal octylamine were mixed together and the resulting solution heated at the boiling temperature (120° C.) for three hours. Following this period of heating the reaction mixture was fractionally distilled under reduced pressure to a final pot temperature of 150° C. to remove the low boiling substituents. The residue was heated at a temperature of 170°–180° C. for 6 hours. The residue, an oil, was poured into 500 milliliters of benzene and washed with 600 milliliters of aqueous 6 percent caustic. The benzene solution was fractionally distilled under reduced pressure to remove the benzene. The residue was refluxed with 200 milliliters of 10 percent caustic for four hours and thereafter diluted with 500 milliliters of water. The insoluble oil layer which formed was extracted with benzene, the extractant washed with dilute hydrochloric acid, then with water and thereafter fractionally distilled under reduced pressure to remove the benzene and to obtain a 2-octyl-3-hydroxyphthalimidine product as an oily liquid. 2-octyl-3-hydroxyphthalimidine has a molecular weight of 248.

Example 4.—2-cyclohexyl-3-hydroxyphthalimidine

One mole (150 grams) of phthalaldehydic acid and one mole (98 grams) of cyclohexylamine were mixed together and the resulting solution heated to the boiling temperature (115° C.) and under reflux for three hours. Following this period the reaction mixture was fractionally distilled to a final pot temperature of 150° C. and under reduced pressure to remove the low boiling constituents. The residue was heated at a temperature of 170°–180° C. for six hours. The resulting residue, an oil, was dissolved in 700 milliliters of hot benzene.

The benzene mixture was cooled to room temperature whereupon a crystalline solid precipitated in the reaction mixture and was recovered by filtration to obtain a 2-cyclohexyl-3-hydroxyphthalimidine product as an crystalline solid melting at 126°–128° C.

The new phthalimidine compounds have been tested and found effective as herbicides, i. e., for the killing of weeds. For such use the product may be dispersed on an inert finely divided solid and employed as a dust. Also, such mixtures may be dispersed in water with the aid of a wetting agent, and the resulting suspensions employed as sprays. In other procedures, the product may be employed as constituents of oil-in-water emulsions, or water dispersions with or without the addition of wetting, dispersing or emulsifying agents.

In a representative operation 2-cyclohexyl-3-hydroxyphthalimidine gave substantially complete control of canary grass root and rape seedling root growth when applied as aqueous solution containing 100 parts per million by weight of the compound as the active ingredient.

We claim:
1. A 3-hydroxyphthalimidine having the formula:

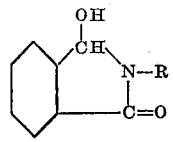

wherein R represents a member selected from the group consisting of alkyl and cyclohexyl, said alkyl radicals having from 4 to 8 carbon atoms, inclusive.
2. 2-butyl-3-hydroxyphthalimidine.
3. 2-octyl-3-hydroxyphthalimidine.
4. 2-cyclohexyl-3-hydroxyphthalimidine.
5. A method for the production of 3-hydroxyphthalimidines which comprises reacting together phthalaldehydic acid and a primary amine at a temperature of from about 100° C. to about 200° C., and recovering a hydroxyphthalimidine having the formula

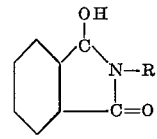

wherein R represents a member selected from the group consisting of alkyl and cyclohexyl, said alkyl radical having from 4 to 8 carbon atoms, inclusive.

No references cited.